United States Patent [19]
Desbrandes

[11] 4,412,180
[45] Oct. 25, 1983

[54] METHOD AND DEVICE WITH ADJUSTABLE FOCUSING FOR MEASURING THE ELECTRIC RESISTIVITY OF GEOLOGICAL FORMATIONS

[75] Inventor: Robert Desbrandes, Sevres, France

[73] Assignee: Institut Francais du Petrole, Rueil-Malmaison, France

[21] Appl. No.: 178,421

[22] Filed: Aug. 15, 1980

[30] Foreign Application Priority Data

Aug. 17, 1979 [FR] France ................ 79 21030

[51] Int. Cl.³ .................................. G01V 3/24
[52] U.S. Cl. ....................................... 324/373
[58] Field of Search ........................ 324/373–375

[56] References Cited

U.S. PATENT DOCUMENTS

| | | | |
|---|---|---|---|
| 2,803,796 | 8/1957 | Schuster | 324/373 |
| 2,824,279 | 2/1958 | Ferre et al. | 324/373 |
| 2,880,389 | 3/1959 | Ferre et al. | 324/373 X |
| 2,925,551 | 2/1960 | Segesman | 324/373 |
| 3,096,477 | 7/1963 | Smith et al. | 324/373 |
| 3,262,050 | 7/1966 | Threadgold et al. | 324/375 |
| 3,365,658 | 1/1968 | Birdwell | 324/373 |
| 3,452,269 | 6/1969 | Welz | 324/373 |
| 3,660,755 | 5/1972 | Janssen | 324/375 |
| 3,760,260 | 9/1973 | Schuster | 324/373 |

*Primary Examiner*—Gerard R. Strecker
*Attorney, Agent, or Firm*—Millen & White

[57] ABSTRACT

The method of the invention comprises determining the variation of the electric potential on both sides of a central electrode in a borehole, detecting the two levels of the borehole where the potential gradient is zero, and measuring the electric resistivity of the geological formation between these two levels.

19 Claims, 24 Drawing Figures

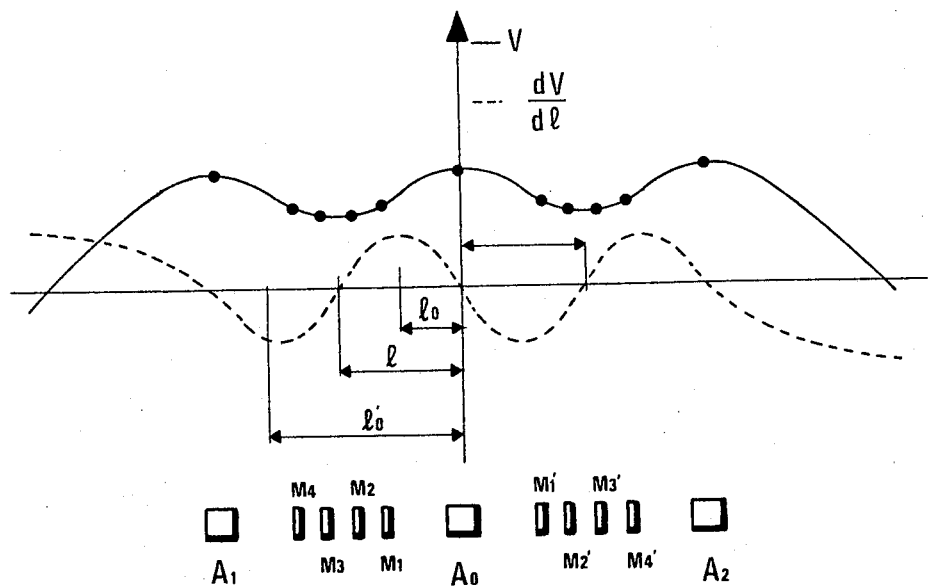
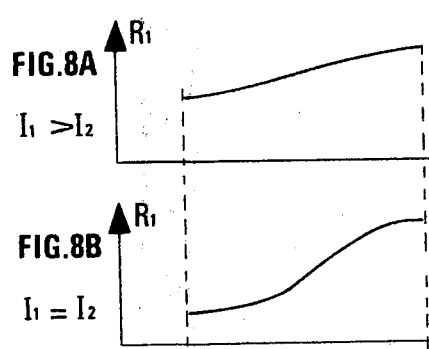
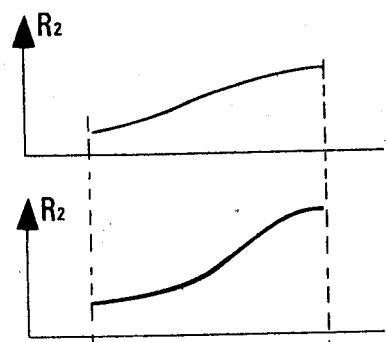
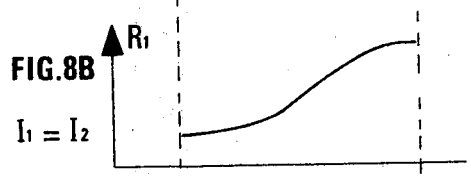
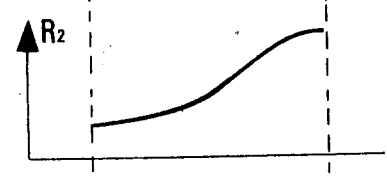
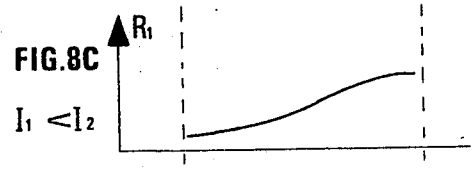
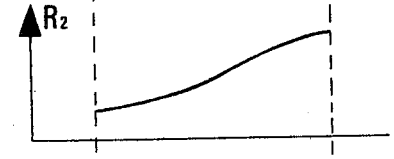
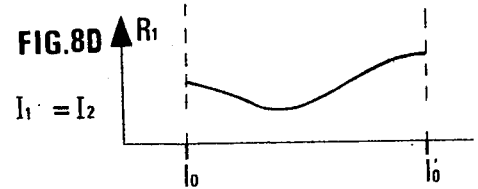
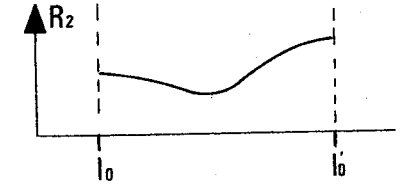

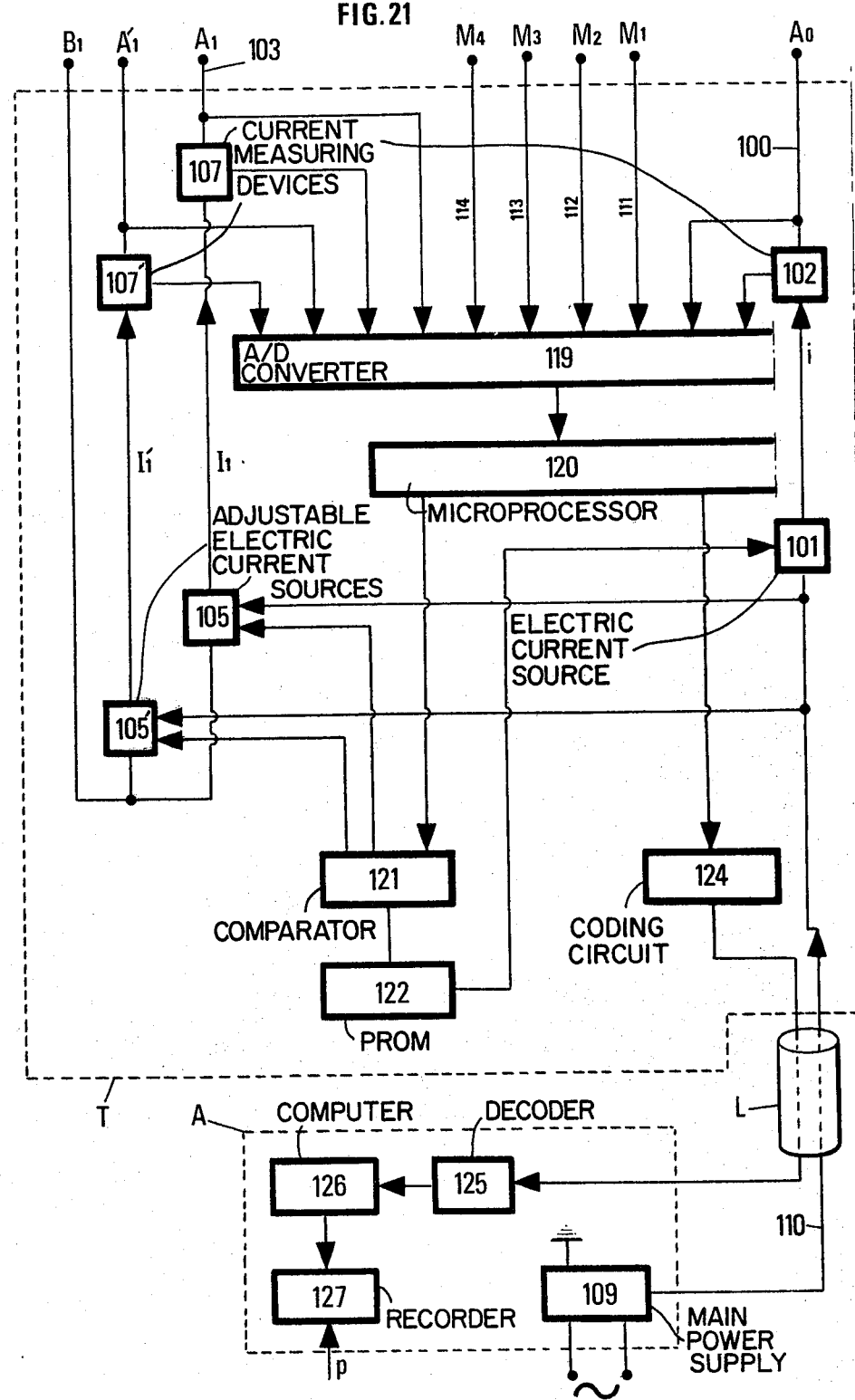

METHOD AND DEVICE WITH ADJUSTABLE FOCUSING FOR MEASURING THE ELECTRIC RESISTIVITY OF GEOLOGICAL FORMATIONS

BACKGROUND OF THE INVENTION

The present invention relates to improved method and devices for measuring the electrical resistivity of geological formations traversed by a borehole.

At the present time, sondes for measuring the electrical resistivity of these formations emit into the formations a main electric current from a central electrode. A predetermined concentration or focussing of the lines of flow of the main electric current is obtained by means of an auxiliary current emitted into the formations by two guard electrodes on each side of the central electrode. The values measured with prior art sondes are average values which do not always represent with sufficient accuracy the sudden variations in resistivity of the geological layers adjacent a borehole drilled therethrough (e.g. French Pat. No. 1 075 314 and U.S. Pat. No. 3,262,050).

SUMMARY OF THE INVENTION

It is an object of the present invention to obviate this drawback by providing for a more accurate measuring of the electrical resistivity of the geological formations adjacent a borehole.

More precisely, the method according to the invention for measuring the electrical resistivity of geological formations traversed by a borehole comprises emitting into the geological formations a main electric current from a central electrode, transmitting electric focussing currents from at least two guard electrodes symmetrically positioned with respect to the central electrode, all of these electrodes being located in the borehole. Moreover, the guard electrodes are separately fed with electric current, the variation of the electric potential on each side of the central electrode is determined in the direction of the guard electrodes, the location of a selected portion of the geological formations is determined as a function of the so-defined variation, knowing the respective intensities of the main electric current, of the focussing currents and the electrical respective potentials of the central and the guard electrodes. A value of the electric resistivity of the geological formations is thus determined and this value is assigned to said portion of the geological formations whose location has been determined.

BRIEF DESCRIPTION OF THE DRAWINGS

The invention will be understood and all its advantages become apparent from the following description illustrated by the accompanying drawings, wherein.

DETAILED DISCUSSION OF THE INVENTION

Figures 1, 2:
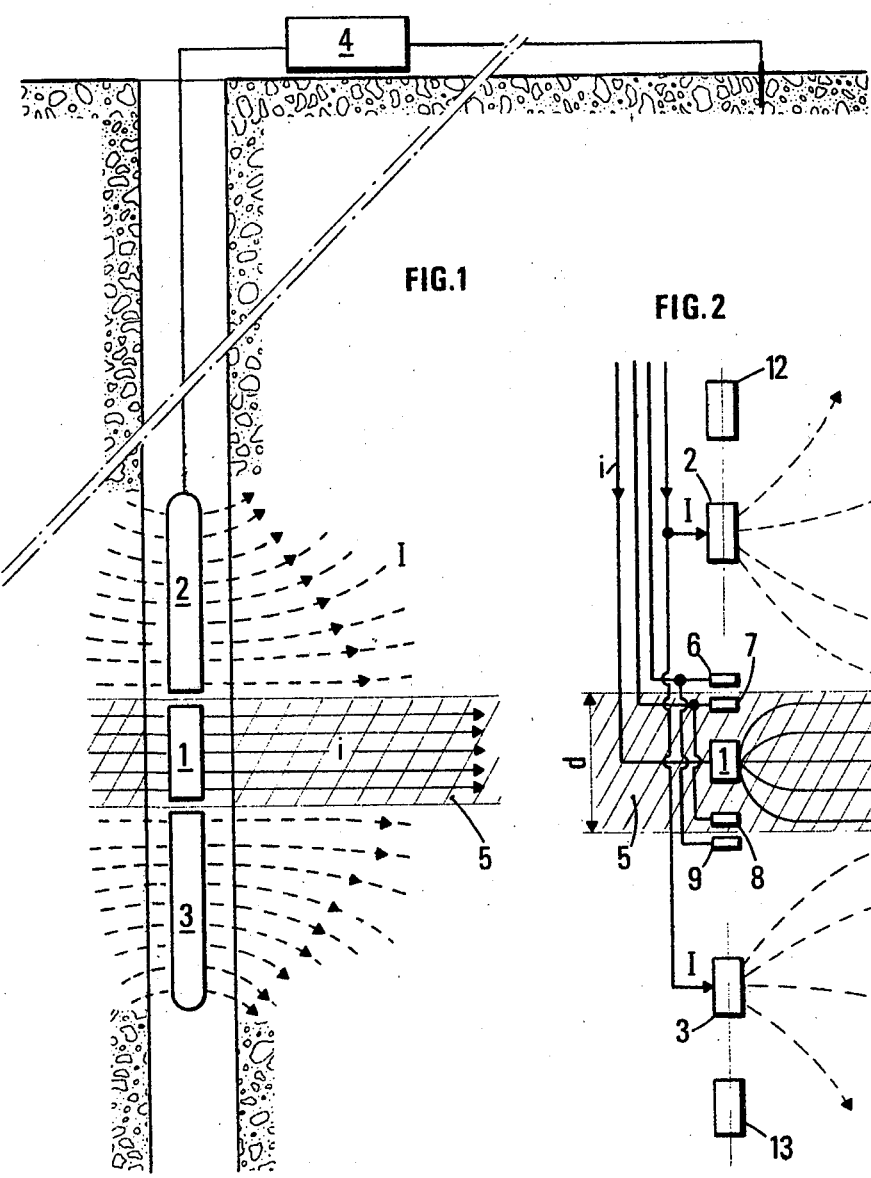
FIG. 1 diagrammatically illustrates the principle of operation of a prior art sonde, FIGS. 2 and 3 also diagramatically illustrate two prior art sondes.

FIG. 1 diagrammatically shows the principle of operation of a prior art sonde for measuring the electrical resistivity, as described in French Patent Specification No. 1 078 314. The sonde comprises a central electrode 1 which emits into the ground an electric current i. Two guard electrodes 2 and 3, located on both sides of this central electrode 1, emit into the geological formations an auxiliary current I focussing the current i. These guard electrodes are, for example, electrically connected in parallel to a source of electric current (not shown).

The device 4 for supplying electric current to the sonde permits maintaining the current intensity i at a substantially constant value, and varying the auxiliary current or guard current I so that the three electrodes 1, 2 and 3 are at the same electric potential. Consequently, from the known values of the electric current i, and of the electric potential of the central electrode 1, it is possible to calculate the resistivity of the ground layer 5 (hachured on FIG. 1), wherethrough flows almost the entirety of the current i emitted by the electrode 1, as shown by the lines of current appearing as solid lines in the drawing. However, it is also possible to maintain constant the potential of the central electrode 1 and to measure the intensity of the current i emitted by this electrode to determine the electrical conductivity of the ground layer 5, and thus its electrical resistivity.

To obtain more accurate measurements, it has been proposed to use sondes with seven electrodes of the type diagrammatically shown in FIG. 2.

This sonde comprises between the guard electrodes 2 and 3 and the main or central electrode 1, two pairs of measuring electrodes 6-7 and 8-9 respectively. These two pairs of electrodes are electrically connected in parallel.

To effect the measurement, the intensity I of the guard current emitted by the electrodes 2 and 3 is adjusted so that the measuring electrodes 6 to 9 are at the same potential. The resistivity of the ground layer 5 can be derived from the value of the potential of the electrode 1, knowing the intensity of the current i which is generally maintained constant. As apparent from FIG. 2, the thickness of the ground layer involved in the measuring operation and wherethrough the whole current i flows is equal to the distance d between the pairs of measuring electrodes 6-7 and 8-9.

This type of sonde provides for a better focussing of the current emitted from the main electrode 1.

Other sondes based on the same concept have been built.

Figure 3:
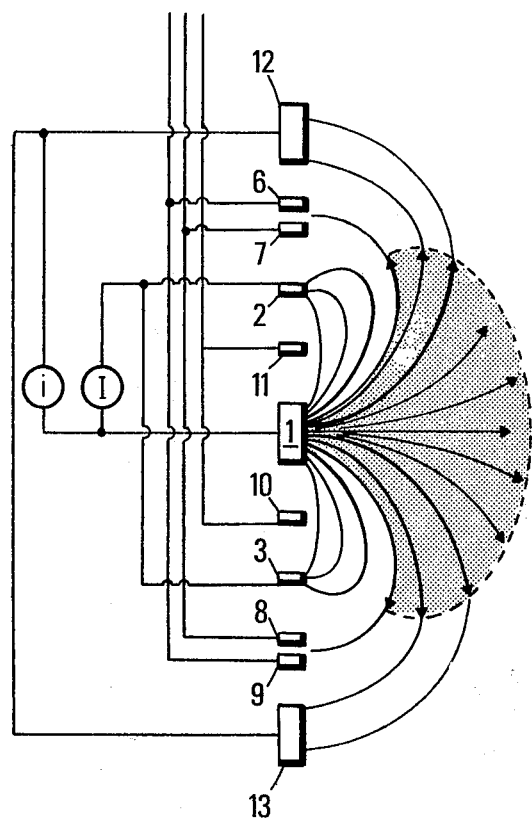

FIG. 3 shows a sonde of the so-called spherical focussing type, whereby there can be determined the resistivity of a limited zone of spherical shape which is shaded on the drawing. The central electrode 1 is fed with a variable current i which flows between this electrode and the terminal electrodes (12,13) spaced apart from each other. This current is adjusted so that all measuring electrodes 6, 7, 8 and 9 are at the same electric potential, while an electric current I, flowing between the electrode 1 and the guard electrodes 2 and 3, maintains a constant reference voltage between the measuring electrodes 6 to 9 and two control electrodes 10 and 11 located between the electrode 1 and the electrodes 2 and 3.

Under these conditions, the current i is proportional to the electric conductivity of the shaded portion of the geological formation, so that the electrical resistivity can also be determined.

In order to achieve more localized measurements, it has been proposed to build sondes of the type illustrated in FIG. 2, wherein the electrodes are carried by a pad in contact with the wall of the well. Sondes of the type shown in FIG. 2 have also been build, wherein the return of the measuring and guard currents is achieved through two electrodes 12 and 13 located at a moderate distance from each other, so as to obtain a less efficient focussing and different ranges of exploration depth.

All of these prior art sondes are described in detail in the publication of the French Petroleum Institute in the series Science et Technique du Pétrole, No. 13, called "Théorie et Interprétation des Diagraphies" by Robert DESBRANDES (Chapters 6 and 7), published by Technip Editions in 1968, and in the specialized literature.

The results obtained with these sondes are relatively accurate when the measurements are effected in homogeneous medium, but this accuracy is substantially reduced when the measurements are carried out in ground layers of rapidly variable resistivity. Moreover focussing of the measuring current which depends on geometrical parameters of the sonde (relative position and size of the electrodes, etc) cannot be varied during the measurement.

Figure 4:
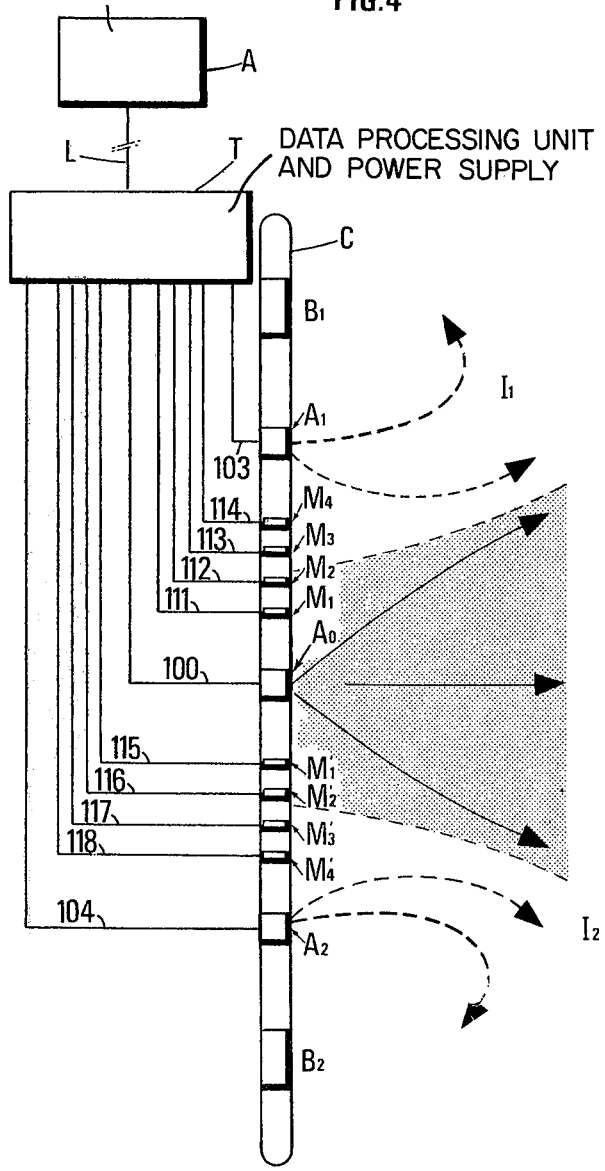
FIG. 4 illustrates a first embodiment of a measuring sonde according to the invention.

The present invention permits elimination of, or at least substantial reduction of these drawbacks, by providing a new type of improved sonde diagrammatically shown in FIG. 4.

This sonde comprises a sonde body C equipped with electrodes connected to a data processing and electric power supply unit T incorporated into the sonde. For clarity of the drawing this unit has been shown outside the sonde body. The sonde is supported by a handling cable (not shown) and the assembly T is connected through a transmission cable L to a surface apparatus A for data processing. The cable L may optionally be incorporated into the handling cable of the sonde, as it is well known in the art. The assembly T and the apparatus A are shown more in detail in FIG. 5 to which it will also be referred while describing the sonde.

Figure 5:
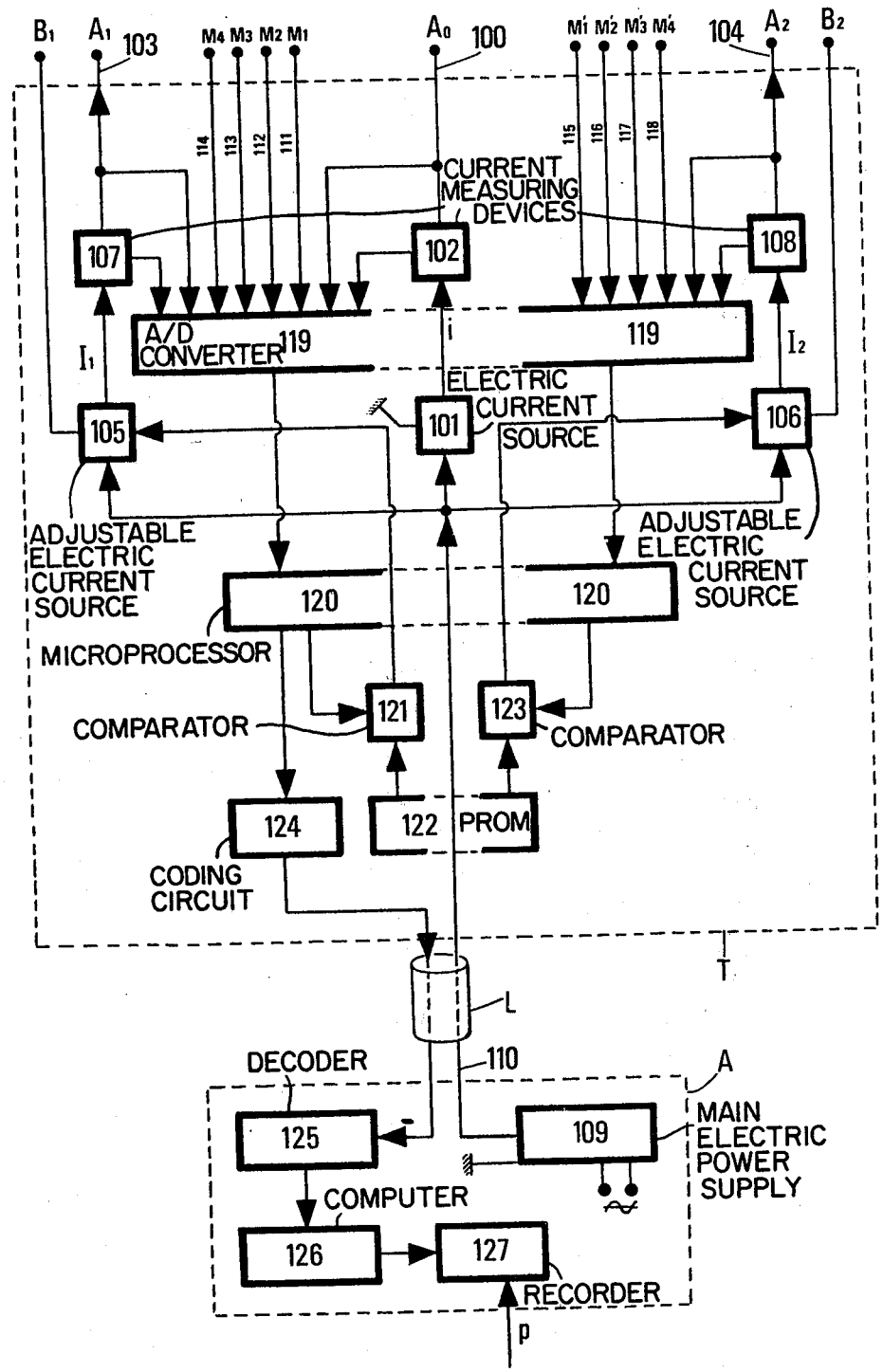
FIG. 5 is a schematic diagram of the electrical circuits associated with the sonde for practising the method of the invention, FIGS. 6 through 8 D illustrate the operation of the sonde according to the invention.

The sonde is provided with a centrally located electrode $A_0$ connected through a conductor 100 to a source of electric current 101 (FIG. 5). The electric current i supplied by the source 101 is measured by a suitable device 102 which may or may not be incorporated to the source of electric current 101.

The current i returns to the mass constituted by the casing of the devices in contact with the mud, or via the cable armouring, or also through an additional (not shown) electrode.

On both sides of the central electrode $A_0$ are located two guard electrodes $A_1$ and $A_2$, respectively connected, via conductors 103 and 104, to two adjustable independent electric sources 105 and 106.

The electric source 105 supplies the electrode $A_1$ with an electric current of intensity $I_1$ measured by a device 107.

The electric source 106 supplies the electrode $A_2$ with an electric current of intensity $I_2$, measured by a device 108.

The paths of the guard currents $I_1$ and $I_2$ are closed via more or less remote electrodes diagrammatically shown at $B_1$ and $B_2$.

The devices 107 and 108 for measuring the currents $I_1$ and $I_2$ may or may not be incorporated in the electric sources 105 and 106.

The electric energy supplied to the sources 101, 105 and 106 is delivered by a main source 109 forming a part of the surface apparatus A and is transmitted through a conductor 110 of cable L.

Between the central electrode $A_0$ and the guard electrode $A_1$ are located several measuring electrodes $M_1$, $M_2$, $M_3$, $M_4$ . . . . Similarly, between the central electrode $A_0$ and the guard electrode $A_2$ are located several measuring electrodes $M'_1$, $M'_2$, $M'_3$, $M'_4$ . . . . Preferably, but not exclusively, the guard electrodes and the two assemblies of measuring electrodes are located symmetrically with respect to the central electrode $A_0$. Moreover, the number of measuring electrodes which must be at least two, may vary, as it is apparent from the following description.

The measuring electrodes $M_1 \ldots M_4$, $M'_1 \ldots M'_4$ are used for measuring the electric voltage between the central electrode $A_0$ and the guard electrodes $A_1$ and $A_2$.

Figure 7:
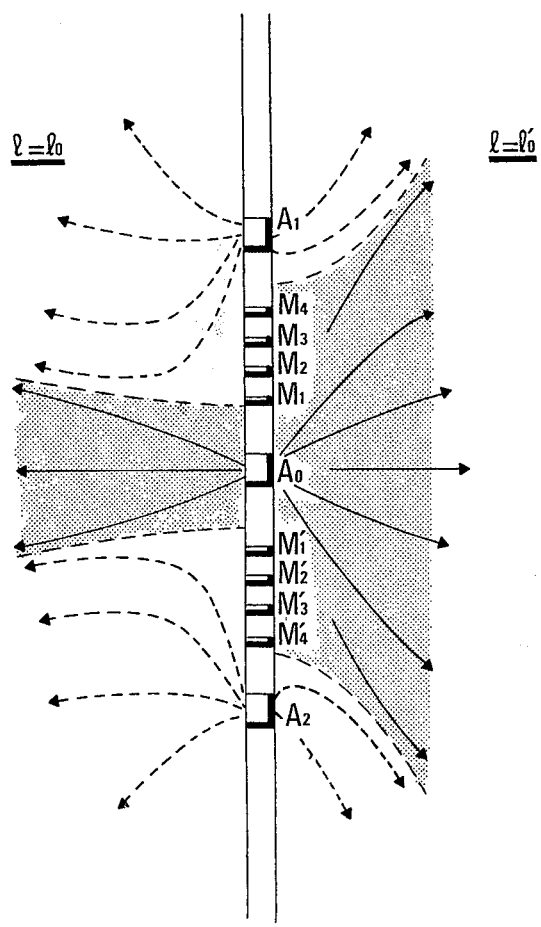

The operation of the sonde according to the invention will be described with reference to FIGS. 6 and 7.

The former represents in solid line the electric potential V on both sides of the central electrode, assuming that the sonde is operated in homogeneous medium and that the focussing currents $I_1$ and $I_2$, emitted by the guard electrodes $A_1$ and $A_2$ have the same intensity. The curve in dashed line shows the voltage gradient, i.e. the first derivative $dV/dl$ of the electric potential V versus the distance l from the central electrode $A_0$.

FIG. 6 shows that this voltage gradient is zero at a distance l of the central electrode $A_0$ under determined operating conditions of the sonde. This means that the current i feeding the main electrode $A_0$ is completely transmitted into the ground formations and flows, in the immediate vicinity of the sonde, through a layer whose thickness is 2l.

As a matter of fact, since at the distance l on both sides of the central electrode $A_0$, the voltage gradient is zero, no electric current flows there along a direction having a component parallel to the sonde axis.

In a homogeneous medium, when the electrodes $A_0$, $A_1$ and $A_2$ are at the same electrical potential and when the current i transmitted by the electrode $A_0$ is kept constant, the distance l is a function of the currents $I_1$ and $I_2$ transmitted by the guard electrodes. Thus, for example, the adjustment of the currents $I_1$ and $I_2$ makes it possible to provide an intense focussing of the current transmitted from the electrode $A_0$, this current i then flowing through a ground layer of a thickness $2l_o$, as shown on the left side of FIG. 7. For other control values of the guard currents, focussing of the current i will occur within a ground layer having a thickness $2l'_o$, as shown on the right side of FIG. 7.

Obviously different values of the guard currents $I_1$ and $I_2$ will result in different values of the distance l, at which the voltage gradient is zero, on both sides of the central electrode $A_0$.

By suitably adjusting the intensity of the guard currents, the distance 21 can be varied between a minimum value close to the length of the central electrode in a direction parallel to the axis of the sonde and a value greater than the distance separating the guard electrodes.

The assemblies of measuring electrodes $M_1, \ldots M_4$ and $M'_1 \ldots M'_4$ permit measurement of the electric potential at different places. Thus it appears that the number of these electrodes is limited only by manufacturing considerations providing for a proper electric insulation of these electrodes, etc, and the desired measurement accuracy. Preferably these measuring electrodes will be located in zones where a generation of a zero voltage gradient is desired.

The respective potentials of the electrodes $M_1$, $M_2$, $M_3$, $M_4 \ldots$ and $M'_1$, $M'_2$, $M'_3$, $M'_4 \ldots$ are measured and transmitted by conductors 111 to 118 (FIGS. 4 and 5) to an analog-to-digital converter 119 which, for sake of clarity, has been shown in two parts in FIG. 5. This converter also receives the electric potentials of the electrodes $A_0$, $A_1$ and $A_2$, as well as the values of the electric currents i, $I_1$ and $I_2$ measured by the devices 102, 107 and 108.

All of the data relating to electric intensities and potentials are transmitted to a micro-processor 120 which is also shown in two parts in FIG. 5. This microprocessor 120 has been programmed for computing the minimum potential values $V_{1min}$ and $V_{2min}$ corresponding to the above-defined points of zero voltage gradient between the electrode $A_0$ and the guard electrodes $A_1$, $A_2$, and determining the distances $l_1$ and $l_2$ between the central electrode $A_0$ and the locations of these minimum values of electric potential.

The circuit 120 delivers a signal which is representative of the distance $l_1$.

This signal is applied to a comparator circuit 121 which also receives a first set or nominal signal from a PROM circuit 122, which is suitably programmed as desired by the sonde operator. This set signal represents the theoretical desired value for length $l_1$. The comparator circuit 121 then delivers a control signal representative of the difference between the signals applied to its input terminals.

This control signal modifies correspondingly the current $I_1$ delivered by source 105 to the guard electrode $A_1$ until the control signal is nullified.

Similarly, the circuit 120 delivers a signal representing the distance $l_2$. This signal is applied to a comparator 123 which also receives a second set signal from circuit 122. This second set signal represents the desired theoretical value for length $l_2$. The comparator 123 then delivers a control signal representing the difference between the signals applied to its input terminals. This control signal modifies correspondingly the current $I_2$ delivered by the electric source 106 to the guard electrode $A_2$, until the control signal is nullified.

When the values of the two control signals are nullified, the circuit 120 transmits to a coding circuit 124, which may be of any known type, signals representative of the currents i, $I_1$ and $I_2$, respectively transmitted from the central electrode $A_0$ and the guard electrodes $A_1$ and $A_2$, of the minimum potentials $V_{1min}$ and $V_{2min}$, and of the distances $l_1$ and $l_2$.

After coding, all these data are transmitted to the surface through cable L, by any known means. These data are decoded by decoder 125 and then transmitted to a computer 126 which determines:

the electric resistivity $R_1 = f(V_{1min}, l_1)$. The function f is defined by using a physical model, either analog or mathematical, which takes into account the geometry of the sonde and of the borehole, the geological layers being considered as plane and perpendicular to the borehole axis, the electrical resistivity $R_2 = f(V_{2min}, l_2)$, the ratio $I_1/I_2$ is a redundant information related to the resistivity ratio $R_1/R_2$ through a relationship which is also derived from a model.

These three parameters, as well as the values $l_1$ and $l_2$, are recorded at 127 versus the depth at which the sonde is located, this depth being indicated by a signal p on the surface apparatus A.

In practice, only the current i is kept constant. Programming of circuit 122 is such that the distances $l_1$ and $l_2$ are equal at any time. For each position of the sonde in the borehole, a series of measurements is performed by successively varying the value $l_1 = l_2 = l$ between two predetermined limit values $l_0$ and $l'_0$, as shown for example in FIG. 6, by varying the value of $I_1$ and $I_2$.

The so-obtained recordings are then of the type diagrammatically shown in FIGS. 8 A to 8 D, which represent respectively the values of $R_1$ and $R_2$ when the focussing of the current i is varied between the values $i_0$ and $i'_0$ for:

(a) $I_1 > I_2$ corresponding to $R_1 > R_2$,
(b) $I_1 < I_2$ corresponding to $R_1 < R_2$,
(c) $I_1 = I_2$ corresponding to $R_1 = R_2$,
(d) $I_1 = I_2$ corresponding to the case where the measured resistivity has a minimum value. This usually means that an "annulus" of salt water which is electrically conducting, has gathered at some distance from the borehole. The method according to the invention is particularly suitable for detecting such a situation.

It would be obviously possible, without departing from the scope of the present invention, to so program the circuit 122 as to obtain measurements wherein the distances $l_1$ and $l_2$ are different.

It is also possible to modify from the surface the programming of the circuit 122 during the measuring operation through connecting wires (not shown)

Figure 9:
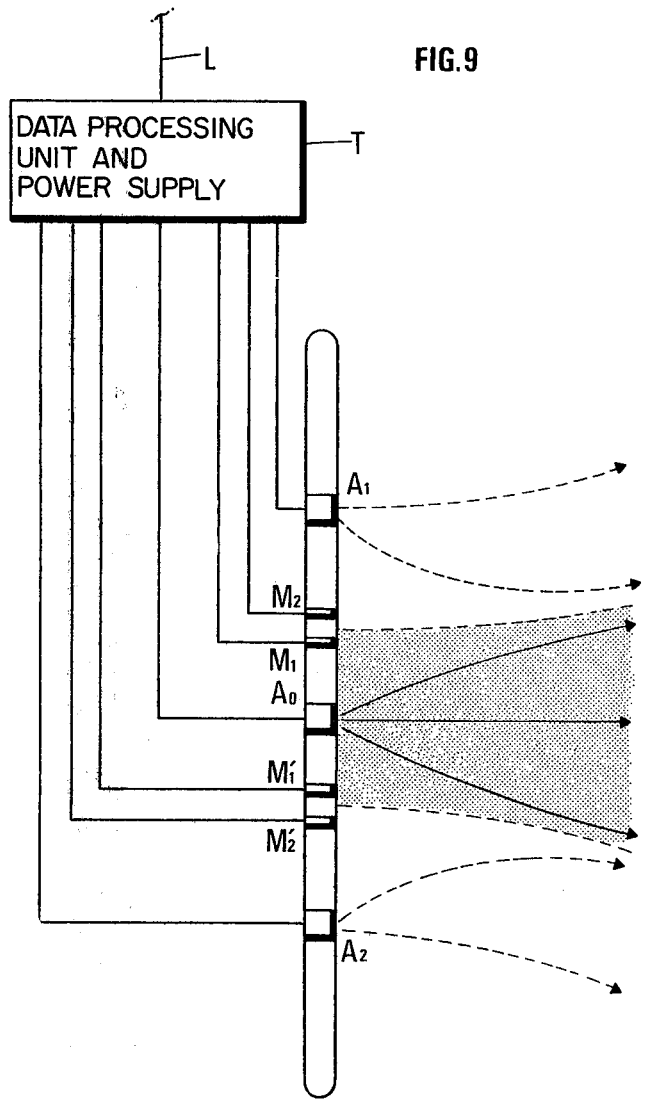
FIGS. 9 to 10 illustrate a simplified embodiment of the measuring sonde of the invention.

When it is not desired to vary the focussing of the current emitted by the central electrode $A_0$ during the measurements, it is possible to use a sonde of a more simple design, as shown in FIG. 9.

This sonde differs from the one illustrated in FIG. 4 in that each group of measuring electrodes comprises only two electrodes $M_1$–$M_2$ and $M'_1$–$M'_2$. Each pair is so positioned that the electrodes are located on both sides of the level where it is desired that the relationship gradient $\overline{V} = 0$ is satisfied.

Figure 10:
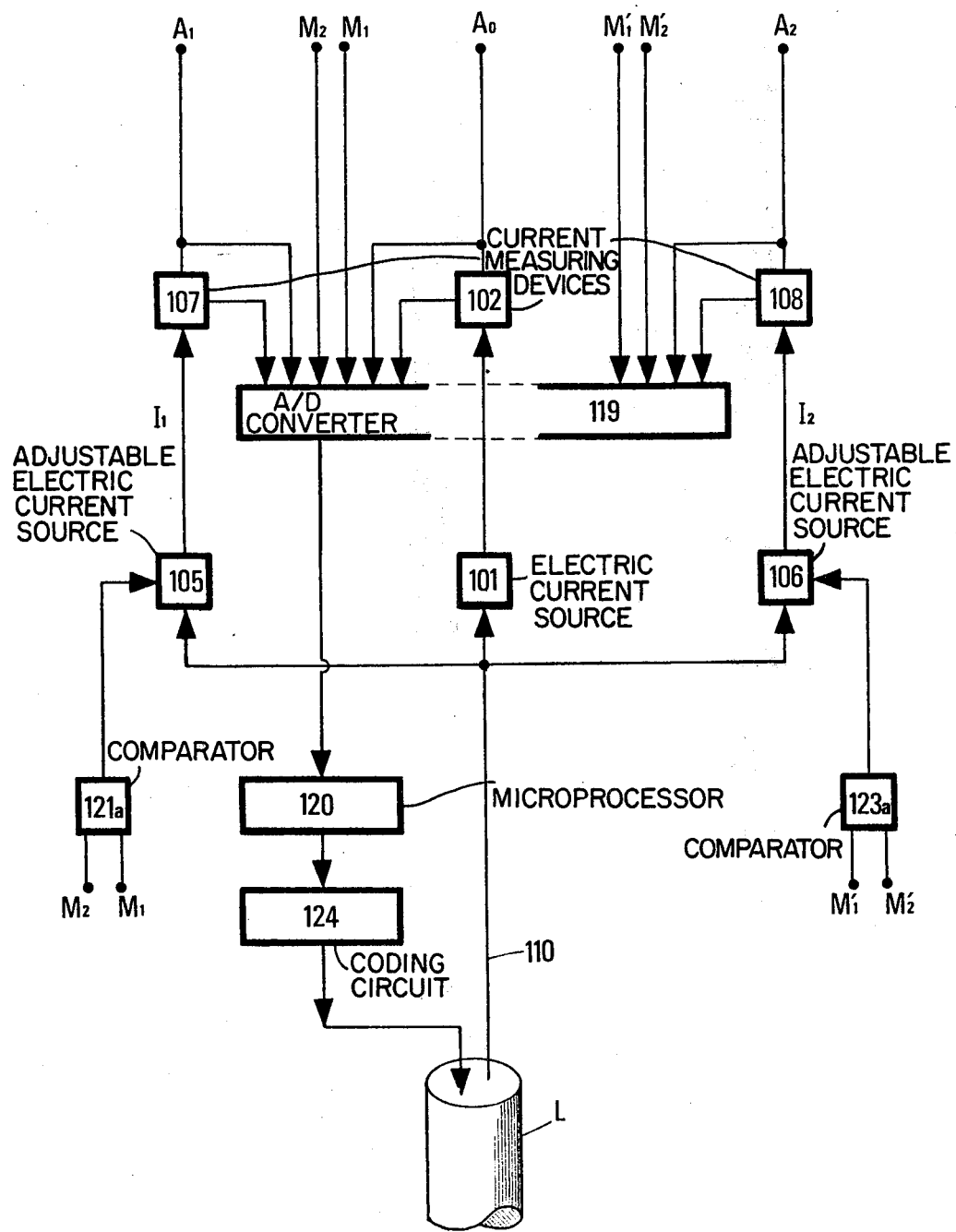

The apparatus T may then be simplified as shown in FIG. 10. The potentials of the electrodes $M_1$, $M_2$ are applied to the input terminals of comparator 121a which delivers a control signal in relation with the voltage difference between the electrodes $M_1$ and $M_2$. This control signal modifies correspondingly the intensity of the current. $I_1$ delivered by the electric source 105, until the voltage difference between the electrodes $M_1$ and $M_2$ is nullified.

Similarly, the current $I_2$, delivered by the source 106, is modified by a signal emanating from a comparator 123a, until the voltage difference between the electrodes $M'_1$ and $M'_2$ is nullified.

Figure 11:
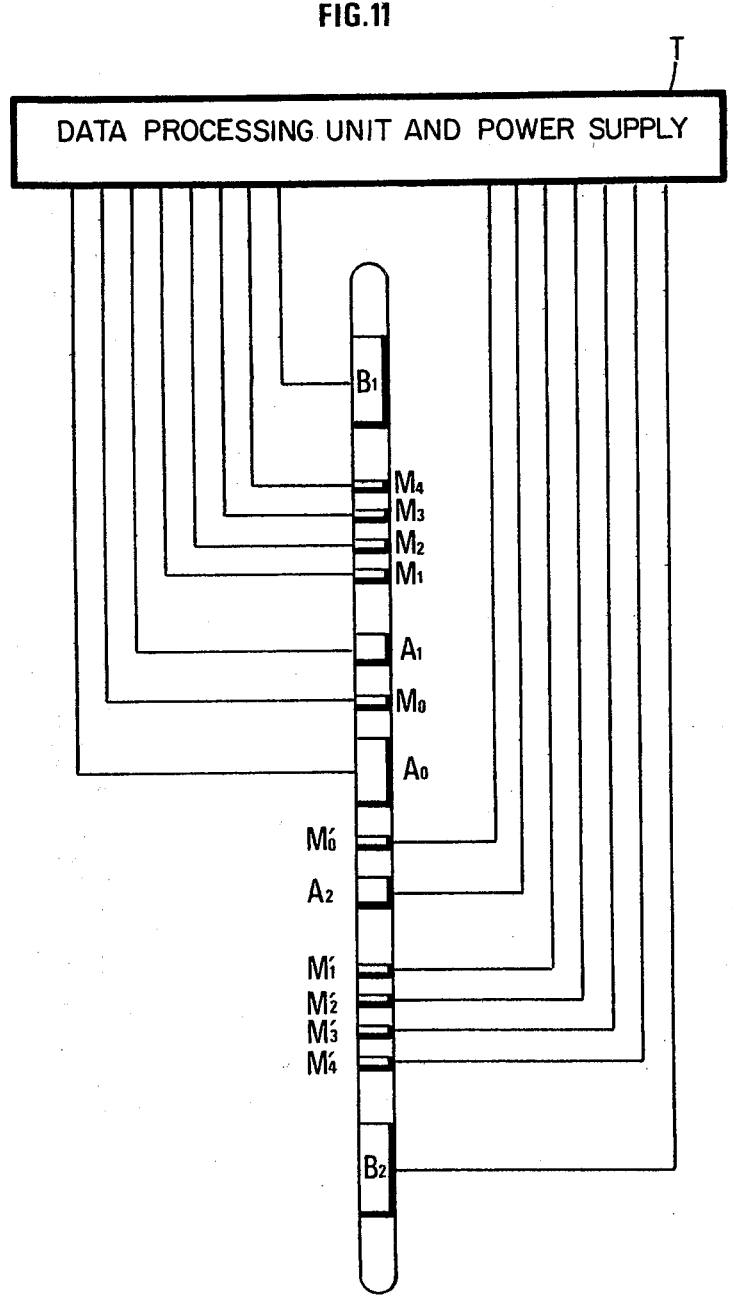
FIGS. 11 and 12 illustrate the application of the invention to a measuring sonde with spherical focussing.

FIG. 11 shows the application of the invention to a sonde with spherical focussing, of the type described in FIG. 3.

$A_0$ designates the central electrode located between the guard electrodes $A_1$, $A_2$, while $M_0$ and $M'_0$ designate control electrodes interposed between electrodes $A_0$ and $A_1$, and $A_0$ and $A_2$ respectively. Electrodes $B_1$ and $B_2$ are located at the ends of the sonde.

Figure 12:
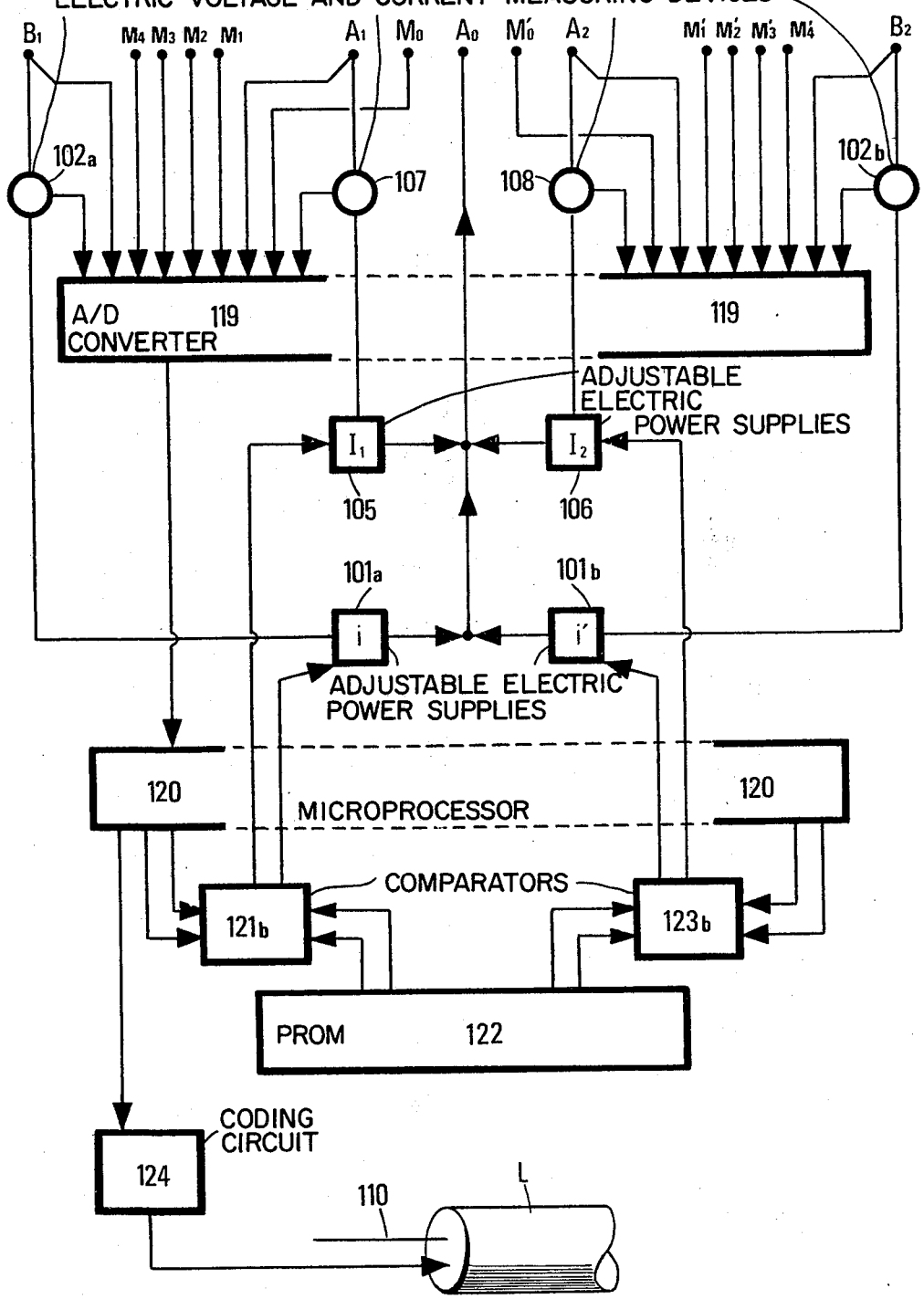

Measuring electrodes $M_1$, $M_2$, $M_3$, $M_4$ . . . are interposed between electrodes $A_1$ and $B_1$ while measuring electrodes $M'_1$, $M'_2$, $M'_3$, $M'_4$ are symmetrically located between electrodes $A_2$ and $B_2$. All these electrodes are connected to the apparatus T, whose schematic diagram is shown in FIG. 12.

An electric supply source 101a is connected to the electrodes $A_0$ and $B_1$ and delivers an adjustable current i. Similarly an electric source 101b, connected to electrodes $A_0$ and $B_2$, delivers an adjustable current i'.

An electric supply source 105, connected to electrodes $A_1$ and $A_0$, delivers an adjustable current $I_1$, while an electric source 106, connected to electrodes $A_0$ and $A_2$, delivers a current $I_2$.

Under these conditions, the central electrode $A_0$ transmits a current equal to the sum $i+i'+I_1+I_2$.

The sources 101a, 101b, 105 and 106 receive electric power through a conductor 110 of cable L (the connections with this cable being not shown for clarity of the drawing).

The respective potential values of all the electrodes as well as the respective values of electric currents i, i', $I_1$ and $I_2$ measured by suitable devices diagrammatically shown at 102a, 102b, 107 and 108, are transmitted to an analog-to-digital converter 119 and then, after transformation, to a microprocessor 120. The latter determines the values of the minimum potentials $V_{1min}$ and $V_{2min}$ which appear between the pairs of electrodes $A_1$-$B_1$ and $A_2$-$B_2$, as well as the distances $l_1$ and $l_2$ between the central electrode $A_0$ and the locations where the minimum electric potentials $V_{1min}$ and $V_{2min}$ are detected. The microprocessor 120 also determines the reference potentials $V_{1Ref}$ and $V_{2Ref}$ defined as the respective differences between the potential of electrode $M_0$ and the value $V_{1min}$ and between the potential of electrode $M'_0$ and the value $V_{2min}$.

The respective values of the currents i, i', $I_1$ and $I_2$, of the minimum potentials $V_{1min}$ and $V_{2min}$, and of the distances $l_1$ and $l_2$, are transmitted to the surface via cable L, after coding in a suitable circuit 124.

The values of $l_1$ and $V_{1Ref}$ are compared to preset values in a comparator 121b which delivers control signals for sources 101a and 105, modifying the currents delivered by these sources until these control signals are nullified.

Similarly, the values $l_2$ and $V_{2Ref}$ are compared to preset values in a comparator 123b which delivers control signals for sources 101b and 106, modifying the currents delivered by these sources until these control signals are nullified.

The different preset values, necessary to vary the focussing of the current transmitted from the central electrode $A_0$, are supplied by a suitably programmed PROM circuit 122.

The surface apparatus processes data delivered by the sonde and indicates, for each position of the sonde in the borehole, the values of the ground resistivity when focussing is varied between two limit values.

Figure 13:
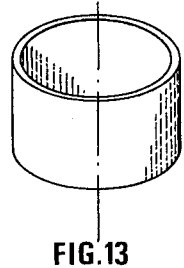
FIGS. 13 to 17 show various alternative embodiments of measuring sondes, and electrodes equipping the same.

In the above-described embodiments, the different electrodes have a generally annular shape (FIG. 13) and are coaxially arranged on the sonde body. The measurements performed with such sondes thus relate to the ground layers distributed all around the borehole axis.

Figure 14:
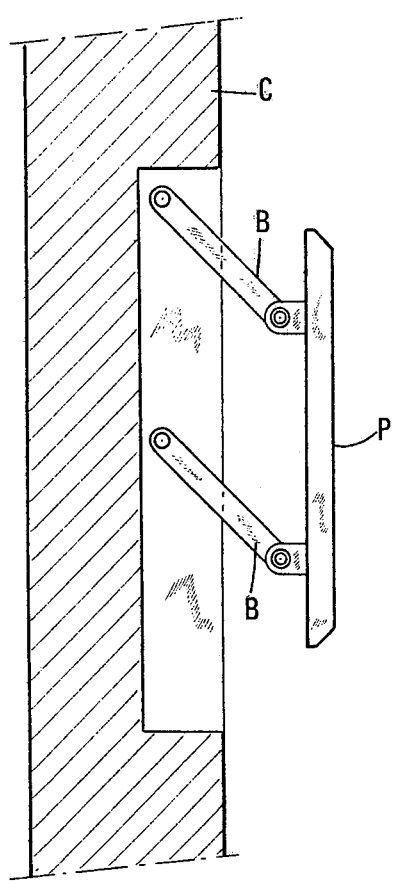

To effect more localized measurements, it is possible to use a sonde of the type diagrammatically shown in FIG. 14. All the electrodes are carried by a pad P integral with the sonde body C.

Hinged arms B apply the pad P agains the borehole wall when effecting the measurement.

Figure 15:
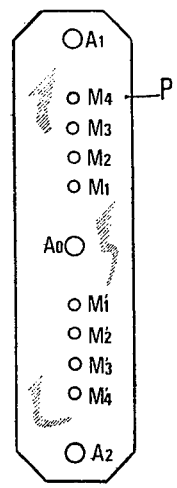

FIG. 15 is a diagrammatic front view of the pad P equipped with electrodes $A_0$, $A_1$, $A_2$; $M_1$ . . . $M_4$, $M'_1$ . . . $M'_4$, these electrodes being aligned on the same straight line which may be parallel or perpendicular to the axis of the sonde body.

Figure 16:
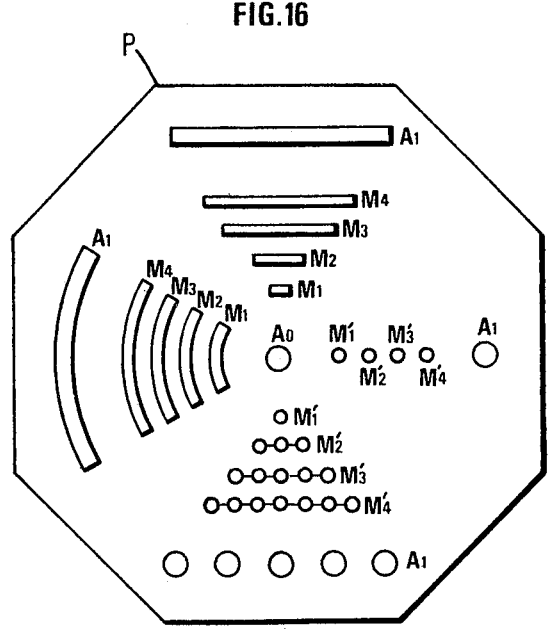

FIG. 16 shows another embodiment of the pad P, which comprises by way of example, only two groups of electrodes positioned at right angles, these two groups including the same central electrode $A_0$. It would be obviously possible, without departing from the scope of the present invention, to use more than two groups of electrodes arranged about the central electrode $A_0$, these groups being suitably distributed to prevent any inter-action.

The electrodes carried by the pad P may have different shapes. Each electrode may be formed of a contact stud, as shown on the right side of FIG. 16, or a plurality of electrically interconnected contact studs (lower part of FIG. 16), of rectilinear connection strips (upper part of FIG. 16), or may have the shape of a circular sector (left side of FIG. 16).

The groups of electrodes of pad P may obviously be identical to the group of electrodes shown in FIG. 4 and permit lateral investigation of the geological formations, or correspond to the group of electrodes diagrammatically shown in FIG. 11 and permit a spherical exploration of the ground.

Figure 17:
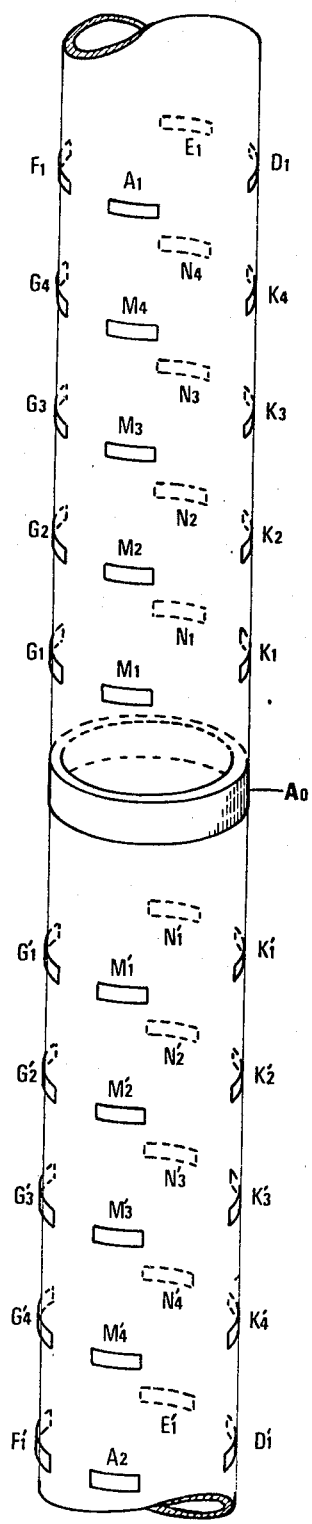

FIG. 17 shows another embodiment of the sonde, which differs from that illustrated in FIG. 4 in that it comprises four groups of electrodes having a common central electrode $A_0$. These four groups are respectively located along four generatrices of the sonde disposed at 90° from one another, for example. More generally, it would be possible to use 2 n groups of electrodes, n being an integer, at angular intervals of 360°/2 n between the consecutive electrodes.

The measurements performed by each group of electrodes permit characterization of the electric resistance of the ground formations.

The voltage differences corresponding to two diametrically opposed groups of measuring electrodes, permit to characterization of the anisotropy and hence the dip of the geological formations when this voltage difference is determined at the level of the measuring electrodes where the component of the voltage gradient parallel to the sonde axis is substantially zero.

It would also be possible to make use of an odd number of electrodes, three for example, which would reduce the complexity of the sonde but would increase that of the computer used for characterizing the slope.

Thus, the voltage differences between the measuring electrodes whose index is 4, such as $M_4$-$N_4$, $M'_4$-$N'_4$, $G_4$-$K_4$, or $G'_4$-$K'_4$ indicate the accurate value of the dip of the geological formations in the immediate vicinity of the borehole wall, while the voltage differences between the measuring electrodes whose index is 1, such as $M_1$-$N_1$, $M'_1$-$N'_1$, $G_1$-$K_1$, $G'_1$-$K'_1$ indicate global values of the dip of the geological formations more remote from the borehole axis.

The apparatus T of the sonde can be easily derived from that illustrated in FIG. 5, completed, as it is well known in the art, so as to permit processing of signals representing the dip of geological formations (see for example, C. and M. Schlumberger and H. G. Dol "The electromagnetic teleclinometer and dipmeter"—World Petroleum Congress, London 1933). Other embodiments may be devised. For example, the sonde may be provided with several pairs of guard electrodes symmetrically arranged with respect to the central electrode $A_0$.

Figure 18:
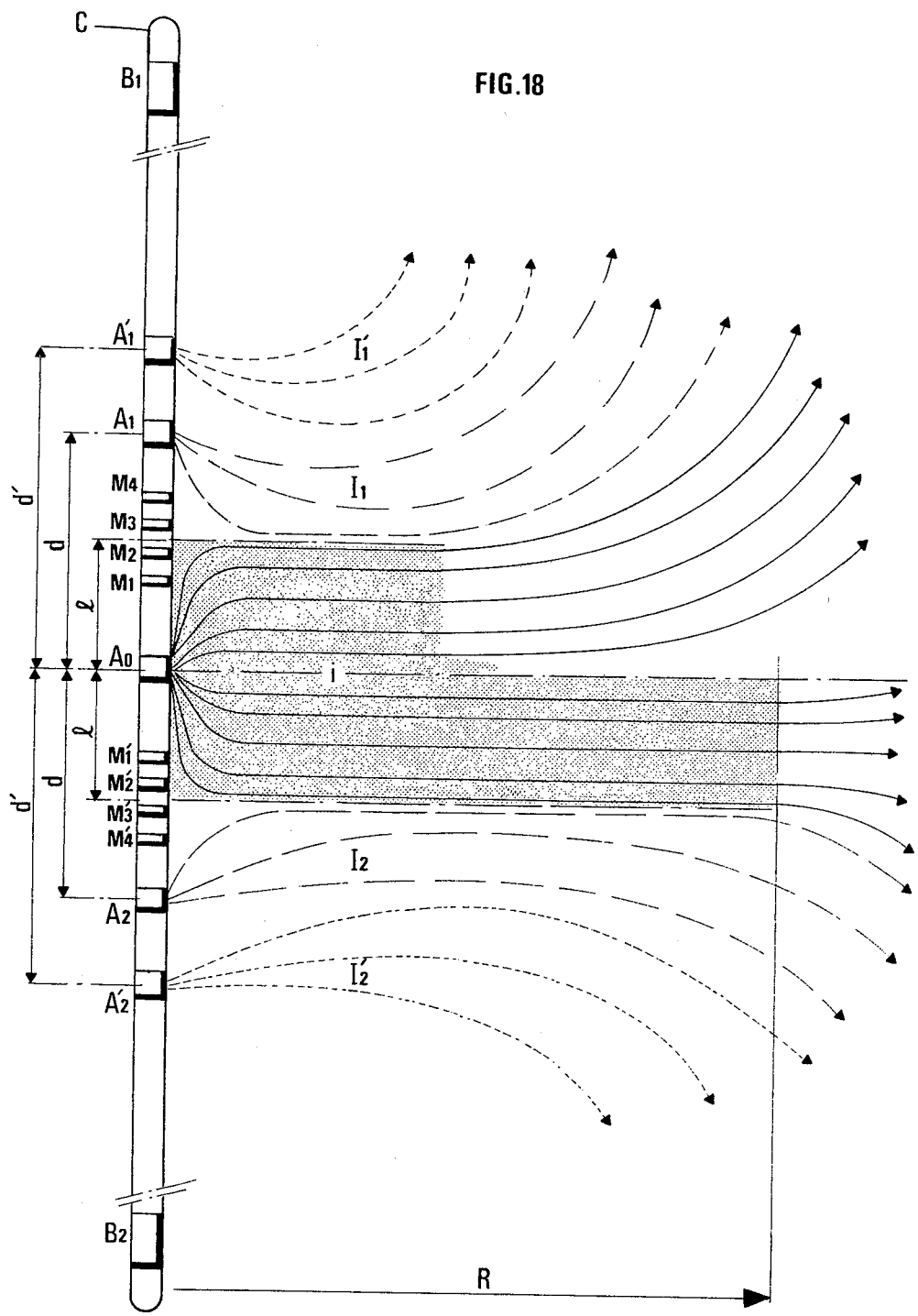
FIG. 18 shows a sonde provided with two pairs of guard electrodes, FIGS. 19 and 20 graphically illustrate the results obtained with the sonde of FIG. 18, and FIG. 21 diagrammatically illustrates the electronic apparatus associated with the sonde of FIG. 18.

FIG. 18 shows a sonde equipped with four guard electrodes $A_1$, $A'_1$ and $A_2$, $A'_2$.

These electrodes transmit into the geological formations currents $I_1$, $I'_1$, $I_2$ and $I'_2$ respectively which can be phase and amplitude regulated independently from one another. The paths of the guard currents $I_1$, $I'_1$, $I_2$ and $I'_2$ are closed via more or less remote electrodes $B_1$ and $B_2$.

Between the central electrode $A_0$ and the group of guard electrodes $A_1$-$A'_1$ are located the measuring electrodes $M_1$, $M_2$, $M_3$, $M_4$ ..., while between the central electrode and the group of guard electrodes $A_2$-$A'_2$ are located the measuring electrodes $M'_1$, $M'_2$, $M'_3$ and $M'_4$ used for controlling the variation of the electrical voltage between the central electrode $A_0$ and the guard electrodes, so as to determine the distance l from the central electrode at which the voltage gradient is zero on both sides of this central electrode $A_0$, and to determine the thickness 2l of the ground layer whereinto the current i is injected.

By way of example, the central electrode $A_0$ is located at a distance $d=1$ meter from electrodes $A_1$ and $A_2$ and at a distance $d'=2$ meters from electrodes $A'_1$ and $A'_2$, the electric current emitted by the central electrode being maintained at the constant value of 1 mA. A voltage gradient equal to zero is observed at a distance $l=0.4$ meter from the central electrode $A_0$ when giving the following intensities to the currents $I_2$ and $I'_2$ or $I_1$ and $I'_1$ in homogeneous medium:

In this particular case, it has been ascertained that the relationship between the constructional parameters (d, d') of the sonde, the intensities (i, $I_1$, $I_2$, $I'_1$ and $I'_2$) of the currents transmitted from the electrodes and the distance l at which appears a zero voltage gradient is:

$$I'_1 = -I_1 \frac{d(d'^2 - l^2)^2}{d'(d^2 - l^2)^2} + i\frac{(d'^2 - l^2)^2}{4l^3 d'} \text{ and}$$

$$I'_2 = -I_2 \frac{d(d'^2 - l^2)^2}{d'(d^2 - l^2)^2} + i\frac{(d'^2 - l^2)^2}{4l^3 d'}$$

It is thus apparent, as diagrammatically shown in the lower and upper parts of FIG. 18, that, by modifying the intensities of the currents transmitted from the guard electrodes, the investigation zone of the sonde can be modified without changing the thickness of the ground layer wherethrough the current i flows.

FIG. 21 shows a partial view of the schematic diagram of the apparatus T similar to that of FIG. 5, to which has been added an electric supply source 105' for electrode $A'_1$ and a detector 107' of the current transmitted from electrode $A'_1$.

What is claimed is:

1. In a method of measuring the electrical resistivity of geological formations traversed by a borehole, comprising transmitting a main electric current into these formations from a central electrode, and transmitting focusing currents from at least two guard electrodes symmetrically located on opposite sides of the central electrode, with said central and guard electrodes being positioned in the borehole, the improvement comprising the steps of:
   (a) separately and independently supplying, from a separate current source, each guard electrode with an electric current to generate an electric potential varying in a predetermined manner between the guard electrodes and the central electrode;
   (b) measuring the relative values of the electrical potential of at least two separate points on respec-

| $I_1 = I_2$ in mA | −1 | 0 | 2 | 2.45 | 2.6 | 2.75 | 2.85 | 3 | 3.12 | 3.24 | 3.47 | 3.71 | 4 | 4.2 | 4.7 |
|---|---|---|---|---|---|---|---|---|---|---|---|---|---|---|---|
| $I'_1 = I'_2$ in mA | 39.24 | 28.8 | 8 | 3 | 1 | 0 | −1 | −3 | −4 | −5 | −7.5 | −10 | −13 | −15 | −20 |
| R in m | 5 | 5 | 5 | 4.5 | 4.25 | 4 | 3.60 | 2 | 1.65 | 1.50 | 1.20 | 1.10 | 1 | 0.90 | 0.80 |

In these measurements R represents the radius of investigation range of the sonde and negative values of the currents correspond to a phase opposition of the electric currents.

The investigation radius R is the theoretical distance through the ground at which is obtained 90% of the voltage signal of the central electrode, in radially homogeneous geological formations.

Figure 19:
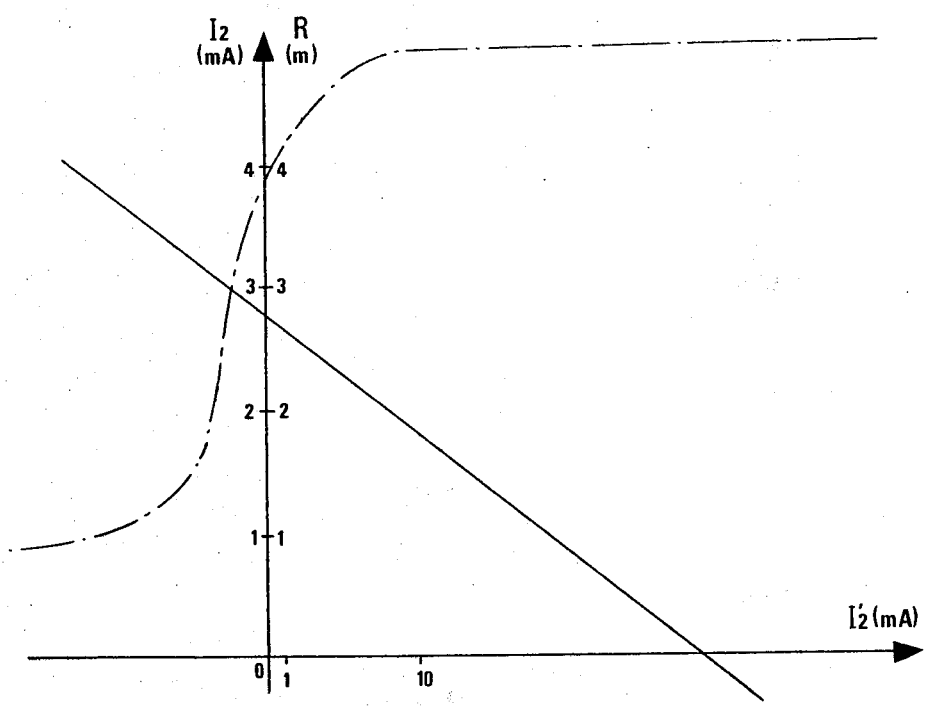

The above values have been plotted on the graph of FIG. 19 which shows in solid line the function $I_2 = f(I'_2)$ and in mixed line the function $R = g(I'_2)$.

Figure 20:
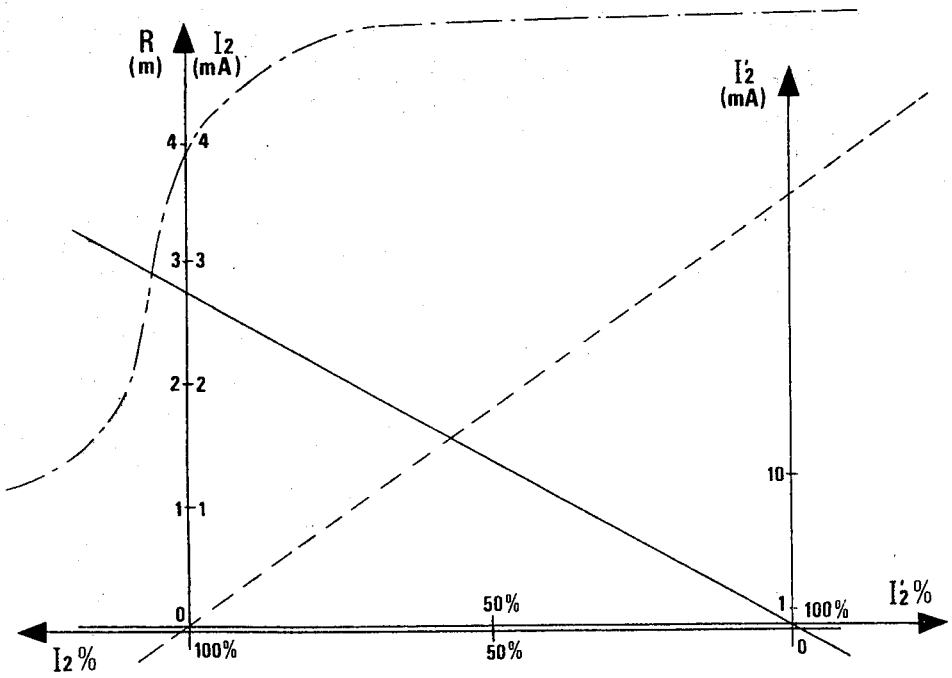

The graph of FIG. 20 shows the same data in another form alloting the value 100% to the intensity $I_2$ for which $I'_2 = 0$ and the value 100% to the intensity $I'_2$ for which $I_2 = 0$.

The value of $I_2$, expressed in %, is shown in solid line, the value of $I'_2$, expressed in %, is shown in dotted line, while the corresponding value of R is indicated by the mixed line.

tive sides of the central electrode, each of said at least two separate points being located between the central electrode and a respective guard electrode, and each of said measuring points being electrically independent from all other measuring points;
   (c) independently adjusting the focusing electric current supplied to each of the guard electrodes, in response to said measured relative potential values of said at least two points between the central electrode and the respective guard electrode to obtain a voltage gradient of a zero value at a pre-selected location on each side of the central electrode to define between said pre-selected locations the geological formation whose electrical resistivity is being measured; and
   (d) processing the values of the guard electrode currents and potentials, and the central electrode current and potential, as adjusted, in a predetermined functional manner to obtain the electrical resistivity of said defined geological formation.

2. In a method of measuring the electrical resistivity of geological formations traversed by a borehole, comprising transmitting a main electric current into these formations from a central electrode, and transmitting focusing currents from at least two guard electrodes symmetrically located with respect to the central electrode on opposite sides thereof, said central and guard electrodes being positioned in the borehole, the improvement comprising the steps of:

(a) separately and independently supplying from a separate current source each guard electrode with an electric current;

(b) measuring the relative values of the electrical potential of at least two separate points, on each side of the central electrode, between said central electrode and said guard electrodes, and each of said measuring points being electrically independent from all other measuring points;

(c) independently adjusting the focusing electric current supplied to each of the guard electrodes in response to the measured relative values of potential to obtain a zero value of the electric voltage gradient at pre-selected locations on each side of the central electrode;

(d) defining a portion of the geological formations as being substantially the portion located between the respective levels of said pre-selected locations;

(e) determining the value of the electrical resistivity of the geological formations from the respective values of the main electric current, of the focusing currents, and of the respective electrical-potential of the central electrode and the guard electrodes; and (f) assigning the so-determined resistivity value to said defined portion of the geological formations.

3. A method according to claim 2, wherein, in one and the same position of the central electrode in the borehole, the intensities of the focussing currents are varied and, for each value of the intensity of these currents, a corresponding value of the electric resistivity of the geological formations is determined.

4. A method according to claim 3, wherein the intensities of the focussing currents are varied independently from each other.

5. A method according to claim 2, wherein the variation of the electric voltage on both sides of the central electrode is determined by a plurality of substantially punctual measurements performed by means of measuring electrodes.

6. A method according to claim 3, making use of at least two pairs of guard electrodes symmetrically located with respect to the central electrode, wherein the currents transmitted by said guard electrodes are varied independently from each other.

7. A method according to claim 6, wherein the intensity of the current transmitted from the central electrode is given a substantially constant value and the intensity of the guard currents is given different values which do not change the distance from the central electrode at which are detected the two borehole levels where the voltage gradient is zero, said different values corresponding to different values of the radius of investigation from the borehole axis.

8. A method according to claim 7, wherein the currents transmitted by the guard electrodes of a same pair of electrodes are so adjusted as to satisfy the following relationship:

$$I' = -I\frac{d(d'^2 - l^2)^2}{d'(d^2 - l^2)^2} + i\frac{(d'^2 - l^2)^2}{4l^3d'},$$

wherein I is the intensity of the current transmitted by the guard electrode which is the nearest to the central electrode, d is the distance between this guard electrode and the central electrode, l is the distance from the central electrode at which a zero voltage gradient is detected, I' is the intensity of the current transmitted by the guard electrode which is the most remote from the central electrode, d' the distance between this guard electrode and said central electrode and i the intensity of the current transmitted by the central electrode.

9. A method as in claim 1, wherein said measuring of the relative values of the electrical potential of at least two separate points on respective sides of the central electrode is conducted at symmetrically arranged points on each side of the central electrode.

10. In a sonde for measuring the electrical resistivity of geological formations traversed by a borehole, the sonde being associated with a surface apparatus for processing signals delivered thereto by the sonde, and comprising a sonde body equipped with an assembly of electrodes including a central electrode, at least two guard electrodes arranged substantially symmetrically on opposite sides of the central electrode and two groups of measuring electrodes, each group of measuring electrodes comprising at least two measuring electrodes, said two groups being arranged substantially symmetrically with respect to the central electrode on opposite sides thereof, the improvement comprising each on of said measuring electrodes being electrically independent from all other measuring electrodes and said sonde comprising plural electrical power sources including a first electrical power source for supplying electric current to the central electrode and a respective second and third electrical power source for supplying electric current to each of said guard electrodes, measuring means associated with said measuring electrodes for measuring the values of an electric potential generated at the respective locations of the different measuring electrodes of the assembly, and said measuring means associated with data processing means for processing signals representing said values of the electric potential measured, and said data processing means also adapted for processing the intensities of the electric currents transmitted by the central electrode and said guard electrodes, control means for independently adjusting the currents supplied by the first, second, and third electrical power sources to the respective central and guard electrodes, said control means being actuable as a function of signals delivered by said data processing means for modifying the intensities of the currents about predetermined values in response to a measured potential at the measuring electrodes, automatic adjusting means adapted to periodically adjust the values of the currents transmitted by the central electrode and the guard electrodes in response to predetermined values corresponding to arbitrarily preselected locations wherein it is desired to generate a zero value of the electric voltage gradient, the resistivity measuring means adapted for determining a value of the electrical resistivity of a portion of the geological formations defined between the respective levels of said preselected locations at which a zero voltage gradient is generated when said sonde is in operation, said resistivity measuring means being adapted for determining said value of the electrical resistivity from respective values of currents supplied to the central electrode and to the guard electrodes, and of the respective electric potential of the central electrode and of the guard electrodes.

11. A measuring sonde according to claim 10, wherein said signal processing means are adapted to measure the true distances between the central electrode and the locations of zero voltage gradients from the respective values of the electric potential at the respective locations of the central electrode and of the different measuring electrodes, and wherein said control means are adapted to modify the intensities of the transmitted electric currents until the values of said measured true distances are equal to said predetermined values.

12. A measuring sonde according to claim 10 or 11, wherein the electrodes have the shape of rings coaxial to the sonde body.

13. A measuring sonde according to claim 10 or 11, wherein the various electrodes are substantially punctual and located along one and the same generatrix of a substantially cylindrical sonde body.

14. A measuring sonde according to claim 12, comprising a plurality of electrode assemblies distributed along separate generatrices of a substantially cylindrical sonde body, the central electrodes of the different electrode assemblies being at the same electric potential.

15. A measuring sonde according to claim 10 or 11, wherein the different electrodes are substantially punctual and are carried by a pad hingedly connected to the sonde body and adapted to contact the geological formations.

16. A measuring sonde according to claim 15, comprising two electrode assemblies having a common central electrode.

17. A measuring sonde according to claim 14, comprising four electrode assemblies distributed along diametrically opposed generatrices, and means for deriving the value of the dip of the geological formations from voltage differences measured at the same level of the sonde.

18. An apparatus as in claim 10 wherein said measuring electrodes are symmetrically arranged along the respective sides of the central electrode.

19. A method as in claim 2, wherein said measuring of the relative values of the electrical potential of at least two separate points on respective sides of the central electrode is conducted at symmetrically arranged points on each side of the central electrode.

* * * * *